United States Patent
Bhatt (10) Patent No.: US 10,310,762 B1
(45) Date of Patent: Jun. 4, 2019

(54) LEASE-BASED LEADER DESIGNATION FOR MULTIPLE PROCESSES ACCESSING STORAGE RESOURCES OF A STORAGE SYSTEM

(71) Applicant: EMC Corporation, Hopkinton, MA (US)

(72) Inventor: Nitin Bhatt, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 311 days.

(21) Appl. No.: 15/251,197

(22) Filed: Aug. 30, 2016

(51) Int. Cl.
  *G06F 16/00* (2019.01)
  *G06F 3/06* (2006.01)
  *G06F 16/22* (2019.01)
  *G06F 16/21* (2019.01)
  *G06F 16/25* (2019.01)

(52) U.S. Cl.
  CPC ............ *G06F 3/0634* (2013.01); *G06F 3/067* (2013.01); *G06F 3/0659* (2013.01); *G06F 16/217* (2019.01); *G06F 16/22* (2019.01); *G06F 16/252* (2019.01)

(58) Field of Classification Search
  CPC ............ G06F 3/0634; G06F 17/3056; G06F 17/30312; G06F 3/067; G06F 3/0659; G06F 17/30306; G06F 16/252; G06F 16/217; G06F 16/22
  See application file for complete search history.

(56) References Cited

U.S. PATENT DOCUMENTS

| 9,230,000 | B1* | 1/2016 | Hsieh | ................ G06F 17/30575 |
| 2005/0132154 | A1* | 6/2005 | Rao | ..................... H04L 67/1097 711/162 |
| 2008/0071853 | A1* | 3/2008 | Mosier | ................ H04L 67/1095 709/201 |
| 2008/0071878 | A1 | 3/2008 | Reuter | |
| 2009/0165018 | A1 | 6/2009 | Junqueira et al. | |
| 2012/0124412 | A1 | 5/2012 | Surkov | |

(Continued)

OTHER PUBLICATIONS

EffatParvar et al.,"Imroved algorithms for leader election in distributed systems",2010,IEEE,V2,pp. 6-10 (Year: 2010).*

(Continued)

*Primary Examiner* — Alexander Khong
(74) *Attorney, Agent, or Firm* — Ryan, Mason & Lewis, LLP (57) ABSTRACT

An apparatus in one embodiment comprises a storage system that includes storage resources accessible to multiple processes. A controller associated with the storage system is configured to control designation of a given one of the processes as a leader relative to the other ones of the processes so as to provide the given process with prioritized access to perform processing operations involving at least one of the storage resources. In conjunction with designation of the given one of the processes as the leader, the controller is configured to permit the given process to obtain a lease on the leader designation for a period of time that is determined based at least in part on a specified time-to-live value. The lease-based leader designation is illustratively implemented without requiring any interaction between the processes. For example, the processes do not need to reach any consensus relating to the designation of the leader.

20 Claims, 7 Drawing Sheets

(56) References Cited

U.S. PATENT DOCUMENTS

| | | | |
|---|---|---|---|
| 2016/0378831 A1* | 12/2016 | Infante-Lopez | .............................. G06F 17/30958 707/769 |
| 2017/0257430 A1* | 9/2017 | Atia | .................... H04L 67/1008 |
| 2018/0018198 A1* | 1/2018 | Yang | .................... G06F 9/4806 |

OTHER PUBLICATIONS

Wikipedia, "Bully Algorithm," https://en.wikipedia.org/w/index.php?title=Bully_algorithm&printable=yes, Jul. 14, 2016, 3 pages.

B. Kolbeck et al., "Flease—Lease Coordination Without a Lock Server," IEEE International Parallel & Distributed Processing Symposium (IPDPS), May 16-20, 2011, 11 pages.

Noritaka Watanabe, "Simple Leader Election," Tritech, Inc., Mar. 2012, 2 pages.

Leslie Lamport, "Paxos Made Simple," ACM SIGACT News, Nov. 2001, 14 pages.

"ZooKeeper," The Apache Software Foundation, 2008-2013, 9 pages.

* cited by examiner

LEASE-BASED LEADER DESIGNATION FOR MULTIPLE PROCESSES ACCESSING STORAGE RESOURCES OF A STORAGE SYSTEM

FIELD

The field relates generally to information processing systems, and more particularly to controlling access to shared resources in information processing systems.

BACKGROUND

In many information processing systems, contention can arise between processes for access to shared resources. For example, in a distributed computing system, multiple processes running on different compute nodes may all need to execute processing operations that would result in modification of the same stored data item. Conventional approaches to addressing such contention involve the multiple processes executing a consensus protocol to elect a particular one of the processes as a "leader" having priority in access to a given shared resource. An example of a conventional consensus protocol is Paxos. Other techniques for leader election are known in the art and include Apache Zookeeper.

SUMMARY

Illustrative embodiments of the present invention provide information processing systems that incorporate lightweight lease-based leader designation techniques. The lease-based leader designation techniques disclosed herein can provide significant advantages over conventional leader election techniques such as Paxos and Apache Zookeeper.

In one embodiment, an apparatus comprises a storage system that includes storage resources accessible to multiple processes. A controller incorporated in or otherwise associated with the storage system is configured to control designation of a given one of the processes as a leader relative to the other ones of the processes so as to provide the given process with prioritized access to perform processing operations involving at least one of the storage resources. In conjunction with designation of the given one of the processes as the leader, the controller is configured to permit the given process to obtain a lease on the leader designation for a period of time that is determined based at least in part on a specified time-to-live value.

The lease-based leader designation is illustratively implemented without requiring any interaction between the processes. For example, the processes do not need to reach any consensus relating to the designation of the leader.

In some embodiments, at least a subset of the processes comprise respective services. For example, the processes may comprise respective instances of the same service.

The storage resources of the storage system may comprise at least one database. In such arrangement, the controller may comprise a database management system having a leader control module configured to designate a given one of the processes as a leader with respect to one or more stored data items of the database.

However, it is to be appreciated that use of databases is not required, and a wide variety of other types of storage resources can be used in other embodiments. Moreover, illustrative embodiments can utilize the disclosed techniques to control access to other shared resources over a network.

The controller is illustratively configured such that only one of the processes is designated as a leader at a given time. The process designated as the leader at the given time has exclusive rights relative to the other processes to perform at least one operation involving one or more of the storage resources.

In operation of an illustrative embodiment, the controller receives a request from a given one of the processes to make that process the leader, and determines if another one of the processes is currently designated as the leader. If another one of the processes is currently designated as the leader, the controller returns to the given process an identifier of the other one of the processes that is currently designated as the leader. If another one of the processes is not currently designated as the leader, the controller designates the given process as the leader, and returns to the given process its own identifier as an identifier of the process that is currently designated as the leader. The controller additionally receives a lease update request from the given process, grants the lease update request automatically if the given process is currently designated as the leader, and sets an expiration time for the lease as a function of a current time and the time-to-live value. The given process remains designated as the leader until such time as the lease expires without being further updated.

As noted above, illustrative embodiments can provide significant advantages over conventional arrangements. For example, these embodiments do not require that any type of consensus among the processes be achieved in designating a particular one of the processes as the leader. In fact, some embodiments do not require any communication at all among the processes, or even that the processes be aware of one another. Illustrative embodiments are therefore readily scalable to large numbers of processes. Moreover, these embodiments are lightweight and are not processor or memory intensive.

These and other illustrative embodiments disclosed herein include, without limitation, apparatus, systems, methods, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
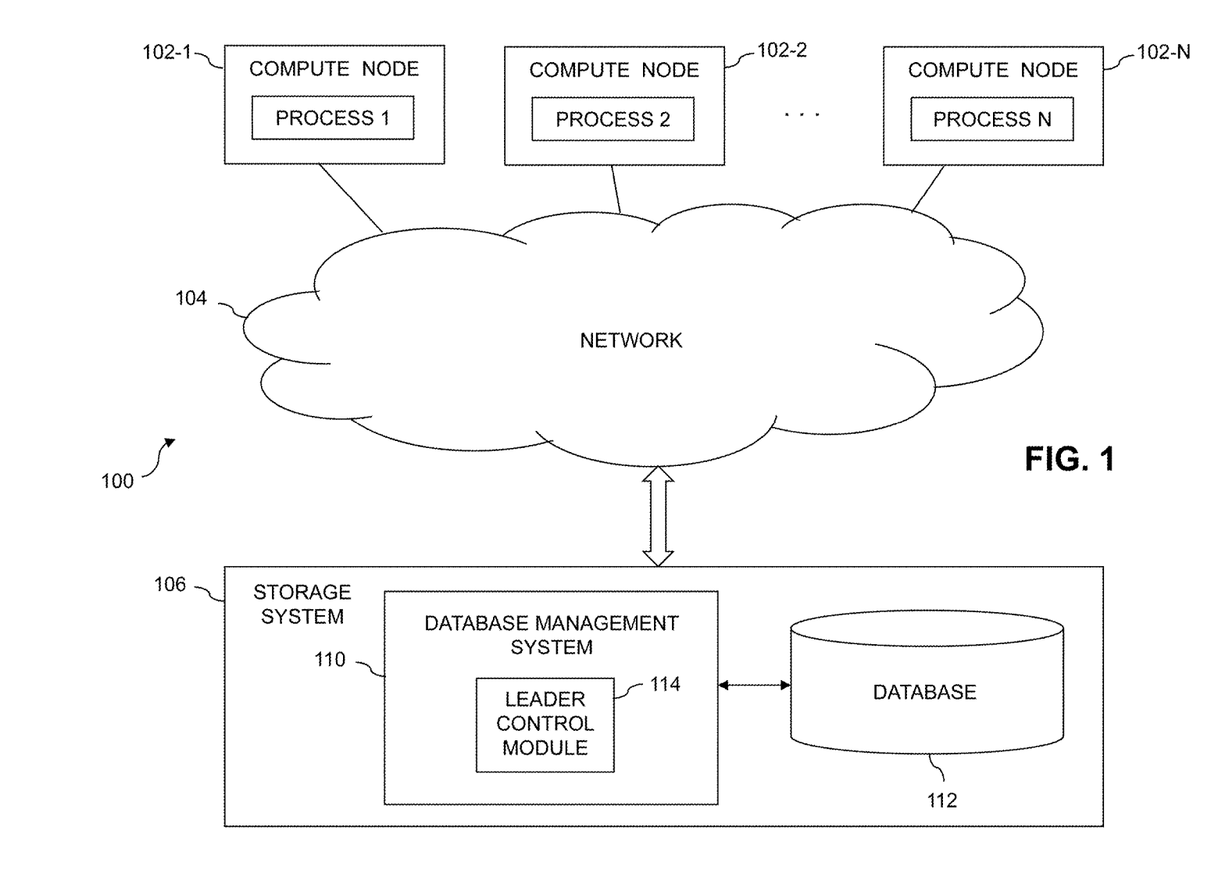
FIG. 1 is a block diagram of an information processing system comprising a storage system that implements lease-based leader designation among multiple processes in an illustrative embodiment of the invention.

FIG. 1 shows an information processing system 100 configured in accordance with an illustrative embodiment of the present invention. The information processing system 100 comprises compute nodes 102-1, 102-2, . . . 102-N that implement respective processes denoted Process 1, Process 2, . . . Process N. The compute nodes 102 communicate over a network 104 with a storage system 106. The storage system 106 comprises storage resources that are accessible to the processes of the compute nodes 102.

The storage system 106 has an associated controller configured to control designation of a given one of the processes as a leader relative to other ones of the processes so as to provide the given process with prioritized access to perform processing operations involving at least one of the storage resources. In conjunction with designation of the given one of the processes as the leader, the controller is configured to permit the given process to obtain a lease on the leader designation for a period of time that is determined based at least in part on a specified time-to-live (TTL) value.

In this embodiment, the controller is implemented in the form of a database management system 110 that controls access of the processes to at least one database 112. Other types of controllers can be used in other embodiments. The database 112 represents just one possible example of storage resources for which access can be controlled using leader designation techniques as disclosed herein. It should be understood that the database management system 110 and database 112 are utilized only by way of non-limiting illustration as an example of one possible storage resource environment. Such elements are not required and accordingly the disclosed leader designation techniques are applicable in numerous other contexts involving a wide variety of different storage resources. The term "storage resources" as used herein is intended to be broadly construed so as to encompass any type of shared resources that are accessible over a network and involve utilization of stored data. Other embodiments can be configured in which the disclosed leader designation techniques are applied in information processing system contexts not necessarily involving access to storage resources.

The database management system 110 in the present embodiment more particularly comprises a leader control module 114 configured to designate a given one of the processes as a leader with respect to one or more stored data items of the database. Examples of leader designation techniques that may be implemented by the database management system 110 utilizing its leader control module 114 are shown in FIGS. 2 through 7.

In some implementations of the information processing system 100, at least a subset of the processes of the compute nodes 102 comprise respective services. For example, at least a subset of the processes may comprise respective instances of the same service. Such services may include microservices implemented in cloud infrastructure, although numerous other types of services can be used.

As one example of a microservices implementation, a given microservice can be built to perform a specific task or subset of tasks associated with an enterprise application. The individual microservices communicate with one another in order to achieve the overall logic of the enterprise application. The given microservice can be deployed as N distinct instances of the same microservice in order to achieve features such as scalability or fault tolerance. In such arrangements, it may be desirable for only one of the N instances of the given microservice to have the exclusive right to perform an operation using shared resources. The lease-based leader designation techniques disclosed herein can provide advantages in this context and numerous other contexts involving shared resources.

As indicated previously, the database management system 110 comprising leader control module 114 is one example of what is more generally referred to as a "controller" associated with the storage system 106. Although this particular controller is shown as being arranged as an internal component of the storage system 106, this is for purposes of illustration only, and other embodiments can include a controller that is implemented at least in part externally to an associated storage system.

By way of example, such a controller in some embodiments is configured to operate as a server relative to the processes which are configured to operate as respective clients, and such a server may be internal or external to the storage system 106 or implemented in a distributed manner using both internal and external components relative to the storage system 106.

In subsequent description, the database management system 110 and leader control module 114 are collectively referred to as a "controller." Numerous other controller implementations can be used.

The controller is illustratively assumed to implement at least the following atomic operations:
1. Set on insert.
2. Update if.
3. Time to live or delete after time.

In some embodiments, the controller need provide only the three atomic operations listed above. Such arrangements advantageously allow the controller itself to be implemented as a lightweight service that is not processor or memory intensive. For example, such a service can run on a server that is separate from or incorporated in the storage system 106. Alternatively, the controller can be implemented using the above-noted atomic operations within an otherwise conventional database management system.

The controller in the present embodiment is configured such that only one of the processes is designated as a leader at a given time. In addition, the process designated as the leader at the given time has exclusive rights relative to the other processes to perform at least one operation involving one or more of the storage resources.

Advantageously, the controller is configured to control designation of a given one of the processes as the leader without requiring any interaction between the processes relating to the designation of the leader and without requiring any consensus among the processes relating to the designation of the leader.

In operation, the controller is configured to receive a request from a given one of the processes to make that process the leader and to determine if another one of the processes is currently designated as the leader.

If another one of the processes is currently designated as the leader, the controller returns to the given process an identifier of the other one of the processes that is currently designated as the leader.

If another one of the processes is not currently designated as the leader, the controller designates the given process as the leader and returns to the given process its own identifier as an identifier of the process that is currently designated as the leader.

Additionally, the controller is configured to receive a lease update request from the given process, to grant the lease update request automatically if the given process is currently designated as the leader, and to set an expiration time for the lease as a function of a current time and the TTL value. The given process remains designated as the leader until such time as the lease expires without being further updated. The TTL value in a given embodiment should generally be set at a value large enough to ensure that a given process designated as the leader has sufficient time to renew its lease on the leader designation, considering network latencies, operational latencies and other factors.

In some embodiments, a maximum amount of time between termination of a given process previously designated as the leader and a point at which another one of the processes can be designated as the leader is given by the TTL value.

The above-described leader designation functionality in the present embodiment is implemented primarily by the leader control module 114 of the database management system 110. The database management system 110 is assumed to incorporate additional functionality typically included in such a component. Such additional functionality relating to management of database 112 is of a type well-known to those skilled in the art and is therefore not described in further detail herein. For example, the database management system 110 can comprise a conventional database management system, such as MongoDB, suitably modified to incorporate lease-based leader designation functionality as disclosed herein.

The compute nodes 102 in some embodiments are implemented by respective virtual machines of cloud infrastructure. For example, such nodes can be implemented using processor and memory components of the virtual machines.

Examples of cloud infrastructure that can be used in some embodiments include public clouds provided by a cloud-based system such as the Amazon Web Services (AWS) system. Other examples of cloud-based systems that can be used to provide virtual machines for implementing compute nodes 102 and possibly other portions of system 100 include Google Cloud Platform (GCP) and Microsoft Azure.

The storage system 106 is illustratively configured to implement at least one file system for data stored by or on behalf of the compute nodes 102. Such a file system may comprise a parallel file system, a distributed file system or combinations of multiple file systems of potentially different types.

In some embodiments, the storage system 106 comprises a software-defined storage pool accessible to the compute nodes 102. Such a software-defined storage pool can be implemented using software-defined storage products such as ScaleIO™ or ViPR® both of which are commercially available from EMC Corporation of Hopkinton, Mass. Accordingly, shared resources of a software-defined storage pool are considered examples of storage resources as that term is broadly used herein.

The storage system 106 may illustratively comprise multiple distinct storage tiers, such as a fast tier and a capacity tier, although such multiple storage tiers are not explicitly shown in the figure. By way of example, the storage system 106 may illustratively comprise a 2 TIERS™ storage system from EMC Corporation, with the fast tier implemented using DSSD™ server-based flash storage devices and the capacity tier comprising one or more object stores. Storage resources can illustratively comprise blocks, files, objects or other data items stored in one or more such storage tiers of storage system 106. Numerous other types of storage resources can be used in other embodiments.

The information processing system 100 can be implemented utilizing processing devices of one or more processing platforms. Such processing devices can be interconnected with one another using high-speed connections. For example, data can be moved between processing devices of the system 100 using remote direct memory access (RDMA) connections over InfiniBand or Gigabit Ethernet. Numerous other types of connections and associated data transfer protocols can be used in other embodiments.

It is to be appreciated that these and other features of illustrative embodiments are presented by way of example only, and should not be construed as limiting in any way. Accordingly, different numbers, types and arrangements of compute nodes, networks, storage systems, storage resources and controllers for providing control of leader designation can be used in other embodiments.

For example, the storage system 106 can illustratively comprise one or more storage platforms. A given such storage platform can comprise any of a variety of different types of storage including network-attached storage (NAS), storage area networks (SANs), direct-attached storage (DAS) and distributed DAS, as well as combinations of these and other storage types, including the above-noted software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The controller illustratively comprising database management system 110 and leader control module 114, as well as other system components, may be implemented at least in part using processing devices of such processing platforms.

For example, a given controller as disclosed herein can be implemented in one or more LXCs running on respective virtual machines or other types of processing devices of a given processing platform.

Communications between the various elements of system 100 take place over one or more networks including the network 104. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 210, and is suitable for use in the system 100 but is more generally applicable to other types of information processing systems comprising a storage system having an associated controller for leader designation among multiple processes sharing access to storage resources over a network. The process is illustratively performed by a controller associated with the storage system, such as the database management system 110 comprising leader control module 114 in the FIG. 1 embodiment.

In step 200, a request is received by the controller from a given one of a plurality of processes to make that process the leader among the plurality of processes. The processes are assumed to share access to storage resources over a network.

In step 202, the controller determines if another one of the processes is already currently designated as the leader.

If another one of the processes is currently designated as the leader, the controller simply returns to the requesting process an identifier of the current leader in step 204, and then moves back to step 200. Otherwise the process moves to step 206.

In step 206, the controller makes the requesting process the current leader and returns the identifier of the current leader to the requesting process. In this case, the returned identifier is the identifier of the requesting process that the controller has just designated as the current leader.

The given process that is designated as the leader relative to the other ones of the processes is provided with prioritized access to perform processing operations involving at least one of the storage resources.

In conjunction with designation of the given one of the processes as the leader, the controller permits the given process to obtain a lease on the leader designation for a period of time that is determined based at least in part on a specified TTL value.

In step 208, the controller receives a request from the current leader to update the lease on the leader designation. This request may comprise an initial lease request received from the given process responsive to that process being designated as the leader. Such an initial lease request is intended to be a type of "lease update request" as that term is broadly used herein.

In step 210, the controller grants the request to update the lease and sets the lease expiry to the current time plus the TTL value. Accordingly, the lease update request is granted automatically if the requesting process is currently designated as the leader. The lease expiry is the expiration time for the lease as set by the controller.

The process then returns to step 200 to process additional requests from the processes sharing access to the storage resources.

Figure 2:
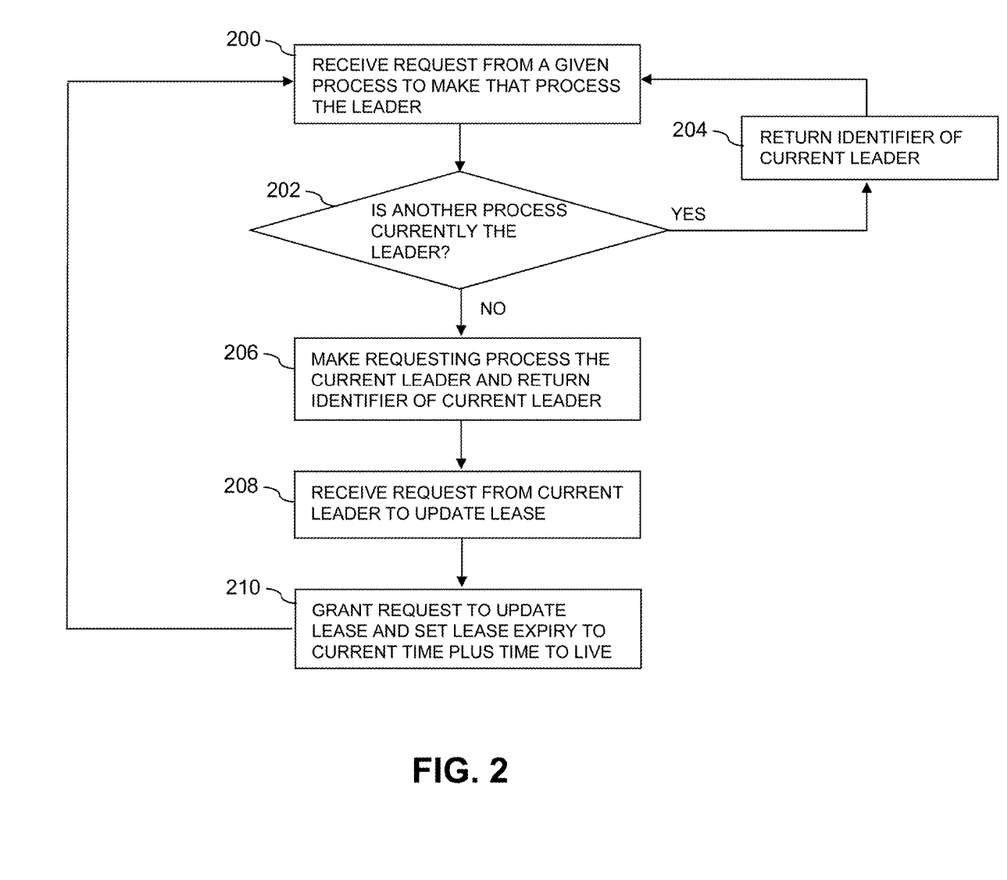
FIG. 2 is a flow diagram of a lease-based leader designation process in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a controller configured to provide leader designation for multiple processes that share access to storage resources. For example, the ordering of the process steps may be varied in other embodiments, or certain steps may be performed concurrently with one another rather than serially. Also, one or more of the process steps may be repeated periodically, or multiple instances of the process can be performed in parallel with one another for different sets of processes or different storage resources within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of leader designation techniques will now be described with reference to FIGS. 3 through 7. In each of these embodiments, a controller is configured to implement lease-based leader designation for multiple processes.

It is assumed without limitation for these illustrative embodiments that the multiple processes subject to lease-based leader designation access shared resources over a network. It is further assumed without limitation that the processes comprise respective instances of the same process and that only one of the processes can be designated as the leader at any given time. The process that is currently designated as the leader has exclusive rights to perform an operation involving the shared resources.

Figure 3:
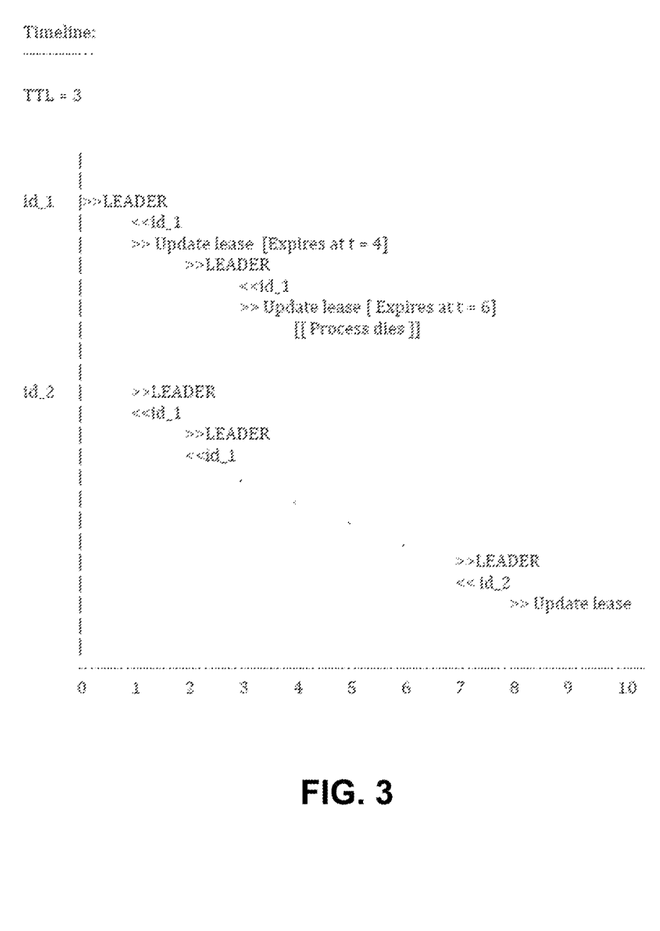
FIG. 3 illustrates a timeline of lease-based leader designation among two example processes in an illustrative embodiment.

Referring now to FIG. 3, a timeline of lease-based leader designation among first and second example processes is shown. The first and second processes have respective identifiers given by id_1 and id_2. Although only two processes are shown in this example, these processes may be part of a larger set of processes. The timeline shows requests received by the controller from the two processes id_1 and id_2 and corresponding responses to those requests generated by the controller. The requests from the processes have prefixes denoted ">>" and the corresponding responses have prefixes denoted "<<". The horizontal axis of the time line is specified in terms of generic time units. This embodiment is assumed to have a specified TTL value given by TTL=3, as indicated.

In the FIG. 3 embodiment, the first process id_1 at time t=0 sends a request to be designated as the leader. The controller responds with id_1, indicating that the requesting process id_1 has been designated as the leader.

The first process id_1 then sends a request to update the lease on its leader designation. The lease update request is sent at time t=1 and as described elsewhere herein is automatically granted by the controller, with the expiration time being the sum of the current time (t=1) and the TTL value (TTL=3), or t=4.

Also at time t=1, the second process id_2 sends a request to be designated as the leader. The controller responds with id_1, indicating that the first process id_1 is already currently designated as the leader.

The second process id_2 at time t=2 again sends a request to be designated as the leader. The controller again responds with id_1, indicating that the first process id_1 is still currently designated as the leader. This is repeated for multiple additional instances as indicated in the figure.

The first process id_1 at time t=2 also sends a request to be designated as the leader. The controller responds with id_1, indicating that the requesting process id_1 is still designated as the leader.

The first process id_1 then sends a request to update the lease on its leader designation. The lease update request is sent at time t=3 and is automatically granted by the controller, with the expiration time being the sum of the current time (t=3) and the TTL value (TTL=3), or t=6.

At time t=4, the first process id_1 is terminated or otherwise "dies" as indicated. However, it has already updated the lease at time t=3 such that the current expiration of the lease is at t=6. Thus, additional requests from the second process id_2 to be made the leader, issued at times t=3, t=4, t=5 and t=6, are similarly unsuccessful, and each such additional request receives as its response the identifier id_1 of the first process.

At time t=7, the second process id_2 sends yet another request to be designated as the leader. The controller responds with id_2, indicating that the requesting process id_2 has now been designated as the leader. The second process id_2 at time t=8 sends a request to update the lease on its leader designation.

It can be seen from this example that the maximum switchover time after the termination of the first process id_1 to the designation of the second process id_2 as the new leader is given by the TTL value, TTL=3.

Although not explicitly illustrated in the FIG. 3 timeline, additional responses containing indications that lease updates have been successful may be sent by the controller to a given one of the processes that sends an update lease request.

In the FIG. 3 embodiment, a given process that is designated as the leader retains that designation until the expiration of the lease. If the given process wants to remain the leader beyond the expiration of the lease, it needs to renew the lease before it expires. This is done in the present embodiment by issuing a leader designation request following by a lease update request, although other request and response arrangements could be used in other embodiments.

FIGS. 4, 5, 6 and 7 show the operation of additional illustrative embodiments that implement lease-based leader designation for multiple processes, in this case comprising respective service instances.

Figure 4:
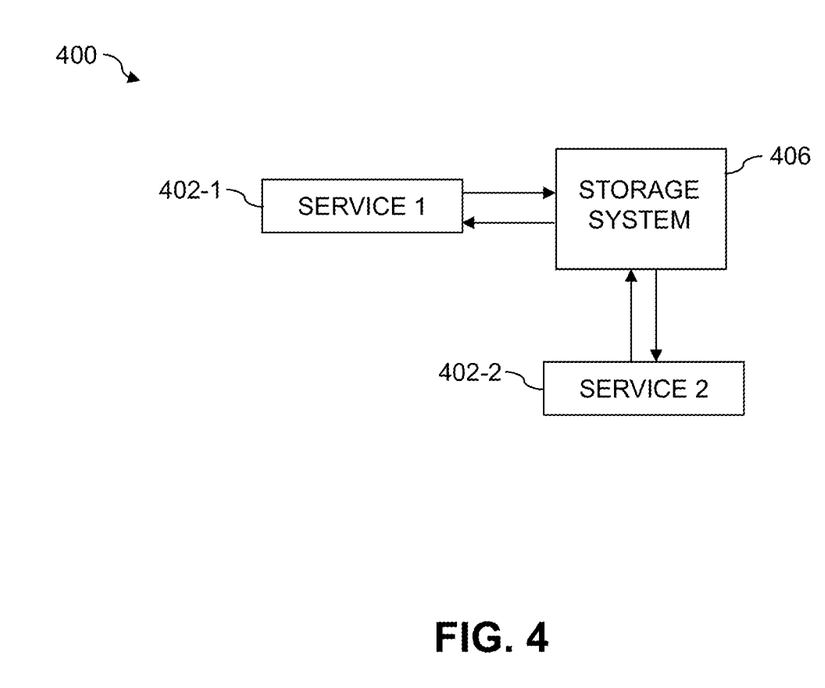
FIG. 4 is a block diagram of an information processing system comprising a storage system that implements lease-based leader designation among multiple processes in another illustrative embodiment.

Referring first to FIG. 4, an information processing system 400 in this embodiment is assumed to comprise first and second processes that are more particularly implemented as first and second services 402-1 and 402-2, also denoted as Service 1 and Service 2, respectively. Each of the services 402 shares access to one or more storage resources of a storage system 406. The two services 402 may be different instances of the same service, or two entirely distinct services. As in the FIG. 3 embodiment, only two services are shown for clarity and simplicity of illustration, although these services may be part of a much larger set of services that share access to the same resources.

Figure 5:
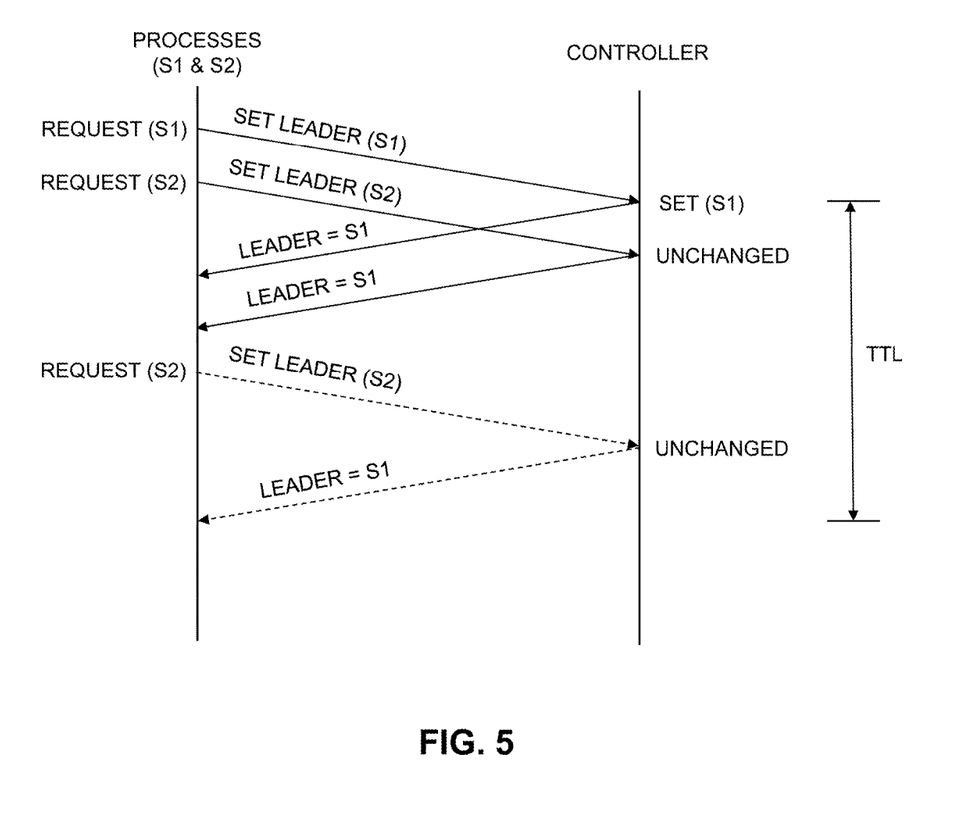
FIGS. 5, 6 and 7 are signaling diagrams showing the operation of illustrative embodiments that implement lease-based leader designation for multiple processes comprising respective service instances.
Figure 6:
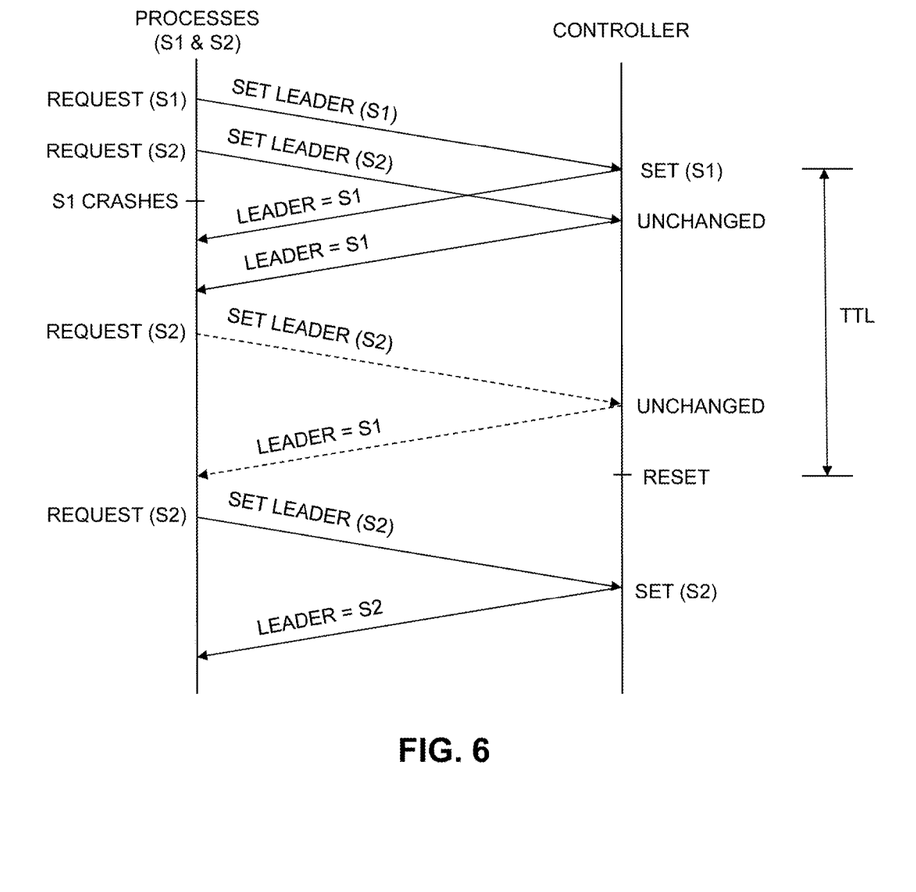
Figure 7:
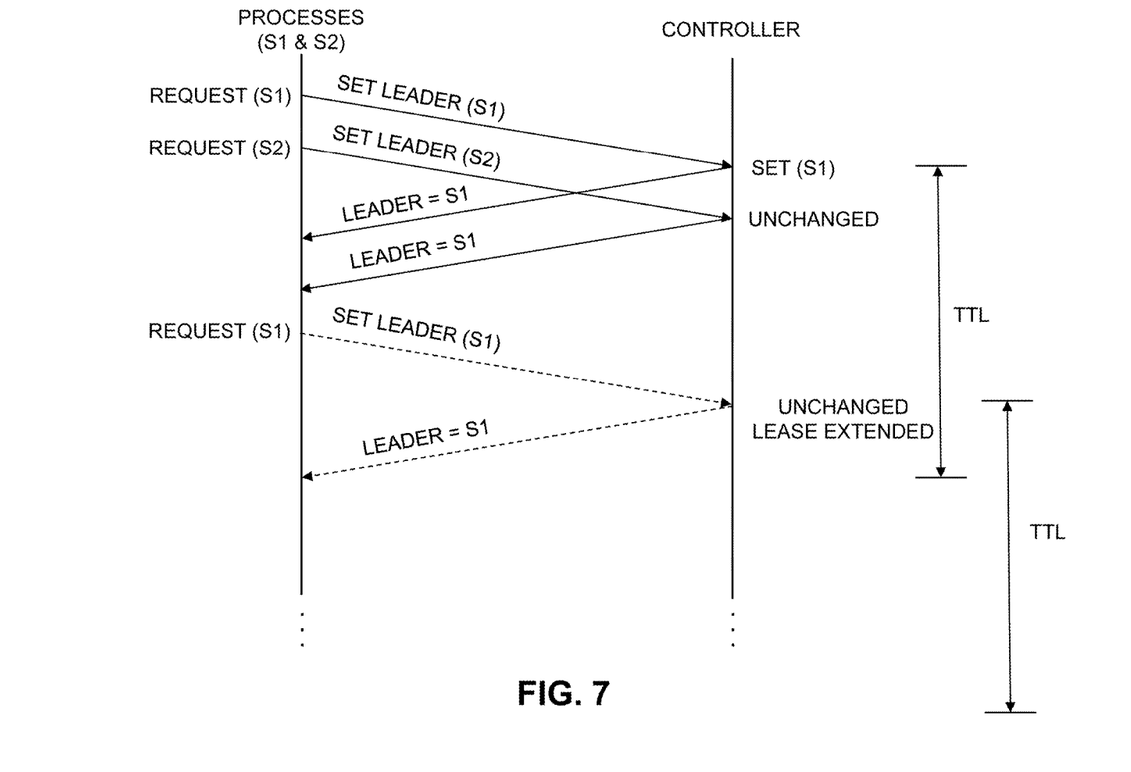

The signaling diagrams in FIGS. 5, 6 and 7 show the interactions between processes comprising the respective services 402 of the FIG. 4 embodiment and a corresponding controller that is illustratively assumed to be implemented within the storage system 406. The services 402 in these diagrams are more particularly denoted as S1 and S2, to refer to Service 1 and Service 2, respectively, of the FIG. 4 embodiment.

In the signaling diagram of FIG. 5, service S1 generates a request to the controller for that service to be designated as the leader. The controller makes service S1 the leader and responds with the identifier S1. Soon after service S1 generates its request, service S2 also generates a request to the controller for that service to be designated as the leader. The controller leaves the current leader designation unchanged and responds with the identifier S1 indicating that service S1 is the current leader. Service S2 repeats its request at least once within the TTL period since S1 was designated as the leader, but any such request is unsuccessful, resulting in return of the identifier S1.

FIG. 6 illustrates a situation in which service S1 crashes or is otherwise terminated after the initial leader requests from services S1 and S2. In this case, S1 remains the leader until the end of the TTL period, after which an additional request from service S2 causes the controller to designate S2 as the new leader. The controller then returns the identifier S2 to service S2 as indicated in the figure.

FIG. 7 illustrates a situation in which the service S1 updates its lease on the leader designation before the end of the first TTL period. In this case, a new TTL period is started from the time at which the lease is extended by the controller.

Subsequent leader designation requests received by the controller within the new TTL period from service S2 will be unsuccessful, as service S1 will remain the leader for that period even if service S1 is terminated prior to the end of the period. The lease update request in this embodiment is in the same format as the initial leader request from service S1, illustratively a "Set Leader" request resulting in a "Leader=" response, although other request and response formats can be used.

Illustrative embodiments disclosed herein can provide a number of significant advantages relative to conventional arrangements.

For example, these embodiments do not require that any type of consensus among the processes be achieved in designating a particular one of the processes as the leader. In fact, some embodiments do not require any communication at all among the processes, or even that the processes be aware of one another. Illustrative embodiments are therefore readily scalable to large numbers of processes. Moreover, these embodiments are lightweight and are not processor or memory intensive, and accordingly can be implemented as an external service or utilizing existing atomic operations of a storage system.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of storage system 106 and its database management system 110 comprising leader control module 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, storage systems, storage resources and associated controllers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a storage system comprising storage resources that are accessible to multiple processes; and
   a controller associated with the storage system and configured to control designation of a given one of the processes as a leader relative to the other ones of the processes so as to provide the given process with prioritized access to perform processing operations involving at least one of the storage resources;
   the controller being configured to control designation of the given process as the leader independent of interaction between the processes;
   wherein in conjunction with designation of the given one of the processes as the leader, the controller is configured to permit the given process to obtain a lease on the leader designation for a period of time that is determined based at least in part on a specified time-to-live value;
   wherein the controller is further configured to receive a lease update request from the given process, to grant the lease update request if the given process is currently designated as the leader, and to set an expiration time for the lease as a function of at least the time-to-live value;
   wherein the controller is further configured to receive a request from the given one of the processes to make that process the leader, to determine if another one of the processes is currently designated as the leader, if another one of the processes is currently designated as the leader to return to the given process an identifier of the other one of the processes that is currently designated as the leader, and if another one of the processes is not currently designated as the leader to designate the given process as the leader and to return to the given process its own identifier as an identifier of the process that is currently designated as the leader; and
   wherein the controller is implemented by at least one processing device comprising a processor coupled to a memory.

2. The apparatus of claim 1 wherein at least a subset of the processes are configured to run on respective compute nodes that access the storage system over at least one network.

3. The apparatus of claim 1 wherein at least a subset of the processes comprise respective services.

4. The apparatus of claim 3 wherein at least a subset of the processes comprise respective instances of the same service.

5. The apparatus of claim 1 wherein the storage resources of the storage system comprise at least one database.

6. The apparatus of claim 5 wherein the controller comprises a database management system having a leader control module configured to designate a given one of the processes as a leader with respect to one or more stored data items of the database.

7. The apparatus of claim 1 wherein the controller is configured such that only one of the processes is designated as a leader at a given time and wherein the process designated as the leader at the given time has exclusive rights relative to the other processes to perform at least one operation involving one or more of the storage resources.

8. The apparatus of claim 1 wherein the controller is configured to control designation of a given one of the processes as the leader without requiring any interaction between the processes relating to the designation of the leader and without requiring any consensus among the processes relating to the designation of the leader.

9. The apparatus of claim 1 wherein the controller is configured to grant the lease update request automatically if the given process is currently designated as the leader, and to set the expiration time for the lease as a function of a current time and the time-to-live value.

10. The apparatus of claim 9 wherein the given process remains designated as the leader until such time as the lease expires without being further updated.

11. The apparatus of claim 1 wherein the controller is configured to operate as a server relative to the processes which are configured to operate as respective clients.

12. The apparatus of claim 1 wherein a maximum amount of time between termination of a given process previously designated as the leader and a point at which another one of the processes can be designated as the leader is given by the time-to-live value.

13. A method comprising:
   providing multiple processes with access to storage resources;
   designating a given one of the processes as a leader relative to the other ones of the processes so as to provide the given process with prioritized access to perform processing operations involving at least one of the storage resources, the designating of the given process as the leader being independent of interaction between the processes;
   in conjunction with designating of the given one of the processes as the leader, permitting the given process to obtain a lease on the leader designation for a period of time that is determined based at least in part on a specified time-to-live value;
   receiving a lease update request from the given process;
   granting the lease update request if the given process is currently designated as the leader; and
   setting an expiration time for the lease as a function of at least the time-to-live value;
   wherein designating a given one of the processes as a leader relative to the other ones of the processes comprises:
      receiving a request from a given one of the processes to make that process the leader;
      determining if another one of the processes is currently designated as the leader;
      if another one of the processes is currently designated as the leader, returning to the given process an identifier of the other one of the processes that is currently designated as the leader; and
      if another one of the processes is not currently designated as the leader, designating the given process as the leader and returning to the given process its own identifier as an identifier of the process that is currently designated as the leader; and
   wherein the method is performed by at least one processing device comprising a processor coupled to a memory.

14. The method of claim 13 wherein permitting the given process to obtain a lease on the leader designation comprises:
   granting the lease update request automatically if the given process is currently designated as the leader; and setting the expiration time for the lease as a function of a current time and the time-to-live value.

15. A computer program product comprising a non-transitory processor-readable storage medium having stored therein program code of one or more software programs, wherein the program code when executed by at least one processing device causes said at least one processing device:
to provide multiple processes with access to storage resources;
to designate a given one of the processes as a leader relative to the other ones of the processes so as to provide the given process with prioritized access to perform processing operations involving at least one of the storage resources, wherein the given one of the processes is designated as the leader is independent of interaction between the processes;
in conjunction with designating of the given one of the processes as the leader, to permit the given process to obtain a lease on the leader designation for a period of time that is determined based at least in part on a specified time-to-live value;
to receive a lease update request from the given process;
to grant the lease update request if the given process is currently designated as the leader; and
to set an expiration time for the lease as a function of at least the time-to-live value;
wherein designating a given one of the processes as a leader relative to the other ones of the processes comprises:
receiving a request from a given one of the processes to make that process the leader;
determining if another one of the processes is currently designated as the leader;
if another one of the processes is currently designated as the leader, returning to the given process an identifier of the other one of the processes that is currently designated as the leader; and
if another one of the processes is not currently designated as the leader, designating the given process as the leader and returning to the given process its own identifier as an identifier of the process that is currently designated as the leader.

16. The computer program product of claim 15 wherein permitting the given process to obtain a lease on the leader designation comprises:
granting the lease update request automatically if the given process is currently designated as the leader; and
setting the expiration time for the lease as a function of a current time and the time-to-live value.

17. The method of claim 13 wherein at least a subset of the processes are configured to run on respective compute nodes that access the storage system over at least one network.

18. The method of claim 13 wherein at least a subset of the processes comprise respective services.

19. The method of claim 13 wherein designating a given one of the processes as a leader relative to the other ones of the processes is performed by a leader control module of a database management system, the leader control module being configured to designate a given one of the processes as a leader with respect to one or more stored data items of a database.

20. The computer program product of claim 15 wherein designating a given one of the processes as a leader relative to the other ones of the processes is performed by a leader control module of a database management system, the leader control module being configured to designate a given one of the processes as a leader with respect to one or more stored data items of a database.

* * * * *